United States Patent
Verdier et al.

(10) Patent No.: US 12,043,123 B2
(45) Date of Patent: Jul. 23, 2024

(54) METHOD FOR CONTROLLING THE ACTIVATION OF A VOLTAGE-CONTROLLED ELECTRIC MACHINE IN A HYBRID TRACTION SYSTEM

(71) Applicant: Vitesco Technologies GmbH, Hannover (DE)

(72) Inventors: Damien Verdier, Toulouse (FR); Jérôme Lachaize, Toulouse (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 397 days.

(21) Appl. No.: 17/436,888

(22) PCT Filed: Mar. 13, 2020

(86) PCT No.: PCT/EP2020/056936
§ 371 (c)(1),
(2) Date: Sep. 7, 2021

(87) PCT Pub. No.: WO2020/183006
PCT Pub. Date: Sep. 17, 2020

(65) Prior Publication Data
US 2022/0161660 A1 May 26, 2022

(30) Foreign Application Priority Data
Mar. 13, 2019 (FR) ...................................... 1902549

(51) Int. Cl.
*B60L 3/00* (2019.01)
*B60K 6/28* (2007.10)
(Continued)

(52) U.S. Cl.
CPC .......... *B60L 3/0046* (2013.01); *H02J 7/0068* (2013.01); *B60K 6/28* (2013.01); *B60L 2210/10* (2013.01);
(Continued)

(58) Field of Classification Search
CPC ............... B60L 3/0046; B60L 2210/10; B60L 2240/427; B60L 2240/527;
(Continued)

(56) References Cited

U.S. PATENT DOCUMENTS 8,314,578 B2 11/2012 Namuduri et al.
8,606,447 B2 12/2013 Namuduri et al.
(Continued)

FOREIGN PATENT DOCUMENTS

CN 101830223 A 9/2010
CN 102795119 A 11/2012
(Continued)

OTHER PUBLICATIONS

Namaduri et al., "Fault-tolerant control of induction motor drive for automotive Belt-Alternator-Starter application", 2011 IEEE Energy Conversion Congress and Exposition, 2011 IEEE, IEEE, Sep. 17, 2011 (Sep. 17, 2011), pp. 267-272 (Year: 2011).*
(Continued)

*Primary Examiner* — Jess Whittington
*Assistant Examiner* — Brian E Yang
(74) *Attorney, Agent, or Firm* — Buchanan Ingersoll & Rooney PC

(57) ABSTRACT

A method for controlling the activation of an electric machine in voltage control mode for an electrical network of a motor vehicle following a failure of a traction battery present in a traction network of the vehicle. The traction network includes the traction battery, the electric machine, an inverter and a DC-to-DC converter connecting the trac-
(Continued)

tion battery to an onboard network of said motor vehicle. The method includes a step of precharging capacitors present in the electrical network and a step of activating the electric machine in voltage control mode for the electrical network. The activation of the electric machine in voltage control mode is activated before the deactivation of precharging.

11 Claims, 3 Drawing Sheets

(51) Int. Cl.
*H02J 7/00* (2006.01)
*H02P 27/06* (2006.01)

(52) U.S. Cl.
CPC ... *B60L 2240/427* (2013.01); *B60L 2240/527* (2013.01); *B60L 2240/547* (2013.01); *B60L 2270/20* (2013.01); *B60Y 2200/91* (2013.01); *B60Y 2200/92* (2013.01); *H02J 2207/20* (2020.01); *H02J 2207/50* (2020.01); *H02P 27/06* (2013.01)

(58) Field of Classification Search
CPC ........... B60L 2240/547; B60L 2270/20; B60L 2210/30; B60L 50/61; H02J 7/0068; H02J 2207/20; H02J 2207/50; B60K 6/28; B60Y 2200/91; B60Y 2200/92; H02P 27/06; Y02T 10/70; Y02T 10/62; Y02T 10/64
See application file for complete search history.

(56) References Cited

U.S. PATENT DOCUMENTS

| 10,065,632 | B2 | 9/2018 | Lennevi et al. |
| 2003/0085680 | A1 | 5/2003 | Wakitani et al. |
| 2012/0303189 | A1* | 11/2012 | Namuduri ........... B60W 50/029 903/902 |

FOREIGN PATENT DOCUMENTS

| CN | 103029594 A | 4/2013 |
| CN | 103419662 A | 12/2013 |
| CN | 105246734 A | 1/2016 |
| CN | 108263219 A | 7/2018 |
| WO | 2013/174280 A1 | 11/2013 |

OTHER PUBLICATIONS

International Search Report and Written Opinion for International Application No. PCT/EP2020/056936, mailed May 6, 2020, with partial English translation, 8 pages.
International Search Report and Written Opinion for International Application No. PCT/EP2020/056936, mailed May 6, 2020, 13 pages (French).
Namuduri, C.S., et al., "Fault-Tolerant Control of Induction Motor Drive for Automotive Belt-Alternator-Starter Application", Sep. 17, 2011, pp. 267-272, XP032067173, Energy Conversion Congress and Exposition (ECCE), 2011 IEEE, IEEE.
Office Action (The First Office Action) issued Dec. 1, 2023, by the National Intellectual Property Administration, P. R. China in corresponding Chinese Patent Application No. 202080020461.9 and an English translation of the Office Action. (25 pages).

* cited by examiner

METHOD FOR CONTROLLING THE ACTIVATION OF A VOLTAGE-CONTROLLED ELECTRIC MACHINE IN A HYBRID TRACTION SYSTEM

CROSS REFERENCE TO RELATED APPLICATIONS

This application is the U.S. National Phase Application of PCT International Application No. PCT/EP2020/056936, filed Mar. 13, 2020, which claims priority to French Patent Application No. 1902549, filed Mar. 13, 2019, the contents of such applications being incorporated by reference herein.

FIELD OF THE INVENTION

The present invention relates to a method for controlling the activation of an electric machine in voltage control mode in a traction network of an electric or hybrid motor vehicle.

BACKGROUND OF THE INVENTION

An electric motor vehicle or the electric portion of a hybrid motor vehicle is typically composed of a traction battery allowing a traction network and an onboard network to be supplied with power.

The traction network consists of a traction electric machine for propelling the vehicle and it is supplied with a high-voltage electric current delivered by a traction battery. An inverter may be inserted between the traction battery and the electric machine.

The traction battery also supplies power to an onboard network which requires a low- or medium-voltage power supply in general. A DC-to-DC converter, or a converter converting a direct current into a direct current of lower voltage, is therefore inserted between the traction battery and the onboard network so as to convert the high-voltage current into low- or medium-voltage current.

The onboard network further comprises consumer elements and, in particular, equipment for managing the motor vehicle such as an electronic control unit. This control unit is installed on board the vehicle in order to control or monitor various control members. Multimedia equipment, electric actuators and light sources are also found in the onboard network.

In the event of failure of the traction battery, the traction network may be operated with the contactors of the traction battery open. The electric machine is then placed in voltage control mode and becomes a current generator so as to regulate the voltage of the electrical network.

In order to control the placement of the electric machine in voltage control mode, the capacitors of the vehicle's electrical network have to be precharged. This makes it possible to guarantee the voltage operating range both of the electric machine and of the DC-to-DC converter. Thus, it is known practice to precharge the capacitors using the traction battery or the DC-to-DC converter. Precharging is stopped when the voltage of the electrical network has reached a predetermined target voltage. The contactors of the traction battery are kept open and the components of the network are activated in parallel and, in particular, the voltage control of the electric machine.

However, this known sequencing leading to the activation of voltage control of the electric machine is not very robust in the sense that precharging may fail. Specifically, in the configuration of voltage control with the contactors open, the equivalent capacitance of the network is limited. Any current draw generated, in particular, by activating the electric machine or the DC-to-DC converter may result in the voltage of the electrical network dropping and thus in the previously precharged capacitors of the network discharging.

SUMMARY OF THE INVENTION

An aspect of the present invention is a reliable and robust method for controlling the activation of the electric machine in voltage control mode on the electrical network.

An aspect of the invention relates to a method for controlling the activation of an electric machine in voltage control mode for an electrical network of a motor vehicle following a failure of a traction battery present in a traction network of said vehicle, the traction network comprising the traction battery, the electric machine, an inverter and a DC-to-DC converter connecting the traction battery to an onboard network of said motor vehicle, the method comprising:
  a first step of precharging capacitors present in the electrical network using a precharging means,
  a second step of activating the electric machine in voltage control mode when the voltage of the electrical network has reached a predetermined threshold value, the electric machine delivering an electric current with a setpoint voltage corresponding to an initial setpoint value equal to the voltage of the electrical network,
  a third step of gradually increasing the setpoint voltage so as to reach a target voltage value of the electrical network,
  a fourth step of deactivating precharging depending on the voltage of the electrical network.

According to one embodiment of the invention, the predetermined threshold value of the voltage of the electrical network corresponds to a voltage value within a range of voltage values for which the electric machine is operational in voltage control mode.

According to another embodiment of the invention, the precharging means is represented by the traction battery.

Advantageously, the fourth step of deactivating precharging is performed when the voltage of the electrical network is higher than the value of the target voltage of the electrical network.

Again advantageously, the target voltage of the electrical network corresponds to the value of the voltage of the electrical network for which the traction battery charges.

According to yet another embodiment of the invention, the precharging means is represented by the DC-to-DC converter.

Advantageously, the fourth step of deactivating precharging is performed when the value of the voltage of the electrical network is equal to the target value of the voltage of the electrical network.

An aspect of the invention also relates to an electrical network in a hybrid or electric motor vehicle, the electrical network comprising a traction battery (1) supplying power to a traction network (3) equipped with an inverter (5) and with a traction electric machine (4) and an onboard network (2) connected to the traction network (3) by a DC-to-DC converter (9), the electric machine (4), the converter (9), the traction battery (1) and the inverter (5) being driven by an electronic control unit present in the onboard network, characterized in that the electronic control unit (10) comprises means for implementing the control method as claimed in any one of the preceding claims.

One advantage of an aspect of the present invention lies in precise and reliable control of the activation of the electric machine in voltage control mode for the electrical network.

Another advantage of an aspect of the present invention lies in the reliability of the method.

Yet another advantage of an aspect of the present invention lies in the reduction in voltage drops in the electrical network when the electric machine is activated in voltage control mode.

Another advantage of an aspect of the present invention lies in ensuring the effective operation of the electric machine in voltage control mode.

BRIEF DESCRIPTION OF THE DRAWINGS

Other features, advantages and details of aspects of the invention will be better understood from reading the remainder of the description which will follow of embodiments given by way of non-limiting example with reference to the drawings, in which.

DETAILED DESCRIPTION OF EMBODIMENTS OF THE INVENTION

Figure 1:
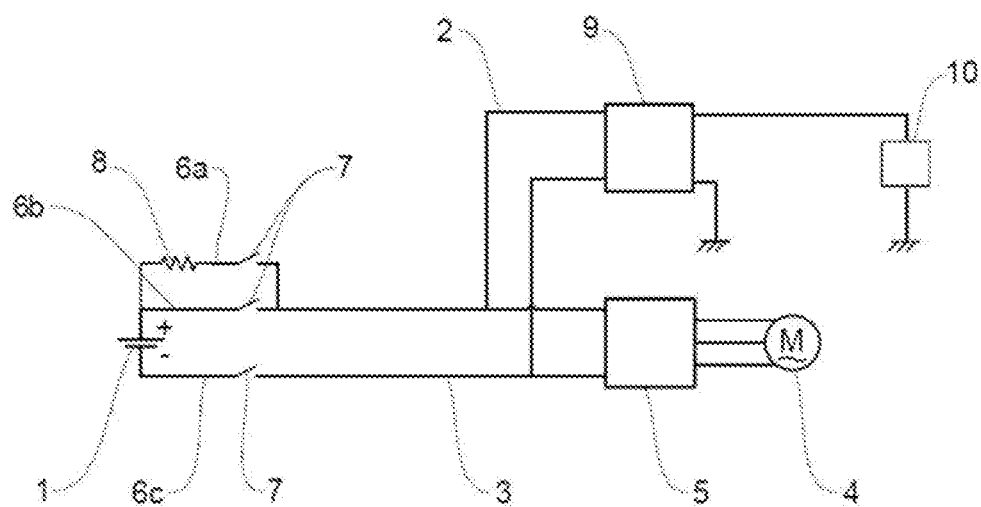
FIG. 1 shows an electrical network in a hybrid or electric motor vehicle.

FIG. 1 shows an electrical network in a hybrid or electric motor vehicle. The electrical network comprises a traction battery 1 that supplies power to a high-voltage traction network 3 which is equipped with an inverter 5 and with a traction electric machine 4.

The traction battery 1 comprises a precharging branch 6a in parallel with a positive branch 6b connecting the positive pole+ of the traction battery 1 to the positive branch of the traction network 3 and to the positive pole+ of the capacitors present in the electrical network. A negative branch 6c connects the negative pole− of the traction battery 1 to the negative branch of the traction network 3. All of the branches 6a to 6c of the traction battery 1 are provided with a contactor 7 and the precharging branch 6a comprises an electrical resistor 8. The electrical resistor 8 allows the charging current to be limited.

The precharging system is known to those skilled in the art and it is usually placed in parallel with the main contactor of the battery. The system ensures the charging of one or more input capacitors of a device connected to the battery before the actual charging system takes over.

Thus, during the precharging of the capacitors of the electrical network by the traction battery 1, the contactors 7 of the positive 6b and negative 6c branches are kept open while the contactor 7 of the precharging branch 6a is kept closed.

The low- or medium-voltage onboard network 2 is connected to the traction network and to the traction battery by means of a DC-to-DC converter 9. The DC-to-DC converter 9 is placed in parallel with the electric machine 4 of the traction network 3. The onboard network 2 at the output of the converter 9 comprises a certain number of items of consumer equipment and, in particular, an electronic control unit 10.

The electronic control unit 10 performs a function of managing the electrical network and, in particular, driving the traction battery 1, the inverter 5, the electric machine 4 and the DC-to-DC converter 8.

Thus, the method for controlling the activation of an electric machine in voltage control mode in a hybrid traction network according to an aspect of the invention may be implemented in the electrical network as described above, without this being limited to this particular type of electrical network.

The method according to an aspect of the invention makes it possible to effectively control the placement of the electric machine 4 in voltage control mode in the event of failure of the traction battery 1.

Failure of the traction battery 1 may occur for many reasons and under these conditions the traction battery 1 is isolated from the electrical network for safety reasons. The contactors 7 are kept open for this purpose and it is then necessary to maintain an electric current in the electrical network to allow the equipment of the electrical network to operate. The electric machine 4 then performs a current generator function in order to control the electrical voltage of the electrical network; it is said that the electric machine 4 is placed in voltage control mode for the electrical network.

To guarantee the voltage operating range of the DC-to-DC converter 9 and of the electric machine 4, it is necessary to precharge the capacitors of the electrical network. Precharging is performed using a precharging means which may be the traction battery 1 via the precharging branch 6a, or the DC-to-DC converter 9. Precharging also makes it possible to reach a predetermined voltage value for the electrical network. Advantageously, the predetermined voltage value is the voltage value for which the electric machine 4 is operational in voltage control mode. The voltage operating range is variable depending on the type of electric machine; it is generally between 36 V and 900 V, preferably between 36 V and 54 V, between 265 V and 450 V or between 530 V and 900 V.

Depending on the electric machine (4) used, the traction battery (1) and the DC-to-DC converter (9) are adapted accordingly.

According to the second step of the method according to an aspect of the invention, the electric machine 4 is activated in voltage control mode when the voltage across the terminals of the electrical network has reached a predetermined threshold value. The predetermined voltage threshold value is, in particular, dependent on the minimum value of the voltage operating range of the electric machine 4 used in the electrical network.

The electric machine 4 then becomes a generator delivering electric current to the entire electrical network with a setpoint voltage equal to the voltage of the electrical network. In this step of the method, the setpoint voltage applied to the electric machine is equal to the voltage of the electrical network when the electric machine 4 is activated in voltage control mode. This is then referred to as the initial setpoint value. This step allows the electric machine 4 to be activated in a safe manner while avoiding voltage drops in the electrical network which may occur during activation. Specifically, when it is activated, the electric machine 4 may cause a current draw which may empty the preloaded capacitors. The fact that precharging is always active makes it possible to tolerate the activation of the electric machine 4 and thus to avoid any voltage drop.

According to the third step of the method, the setpoint voltage applied to the electric machine 4 is gradually increased to a target voltage value higher than the initial setpoint value. One very first advantage of this step is to ensure that the electric machine 4 operates in voltage control mode. Ultimately, this step makes it possible to gradually increase the value of the voltage of the electrical network in order to guarantee the gradual startup of the equipment of the electrical network. According to the fourth step of the method, the precharging of the capacitors of the electrical network is stopped. Precharging is stopped when the electric machine 4 delivers the current required for the activation and operation of the various items of equipment of the electrical network. Thus, precharging is stopped when the voltage of the electrical network reaches a target voltage value. This target voltage value is, in particular, dependent on the type of electric machine 4 used and also on the precharging means used.

Depending on the precharging means used, the value of the target voltage for which the electric machine 4 no longer needs the support of the precharging means differs.

The principle underlying an aspect of the invention is based on the fact that precharging is kept active during the activation of voltage control of the electric machine 4. This makes it possible to avoid collapsing the electrical network when the electric machine 4 is activated, as is often the case when precharging is deactivated before the activation of the electric machine 4. In addition, the third step of gradually increasing the setpoint voltage to a target voltage higher than the initial setpoint voltage makes it possible to limit or even eliminate potential voltage drops in the electrical network which may occur during the activation of the other items of equipment in the electrical network. This step also makes it possible to ensure that the electric machine 4 operates in voltage control mode.

Figure 2:
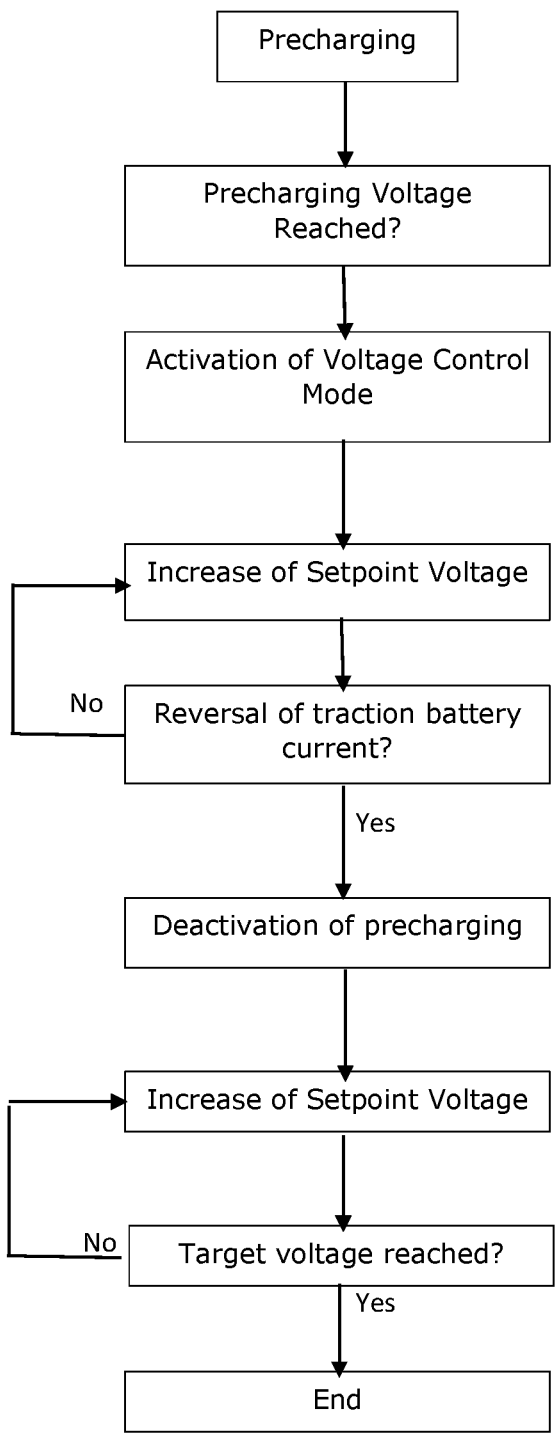
FIG. 2 shows a diagram of the method according to one embodiment of the invention in which the traction battery is used as precharging means.

FIG. 2 is a diagram showing the various steps of the method according to one embodiment of the invention. In this embodiment, the capacitors of the electrical network are precharged by the traction battery 1. In this embodiment, only the contactor 7 of the precharging branch 6a is closed.

The traction battery 1 is then configured, by the electronic control unit 10 for example, to deliver a current to the electrical network. As soon as the voltage of the electrical network reaches a predetermined threshold value, it is then said that the precharging voltage has been reached. The electric machine 4 is then activated in voltage control mode.

In this embodiment of the invention, the predetermined threshold value corresponds to the voltage value of the traction battery.

The electric machine 4 is then configured, by the electronic control unit 10 for example, to deliver an electric current with a setpoint voltage corresponding to an initial setpoint value equal to the voltage of the electrical network.

The setpoint value is then gradually increased so as to reach a target voltage value of the electrical network. In this embodiment shown in FIG. 2, precharging is deactivated when the voltage of the electrical network is higher than the value of the voltage delivered by the traction battery 1. Thus, the target voltage value of the electrical network corresponds to the value of the voltage of the electrical network for which the traction battery charges. Specifically, once the voltage generated by the electric machine 4 is higher than the voltage generated by the traction battery 1, a current reversal takes place in the precharging branch 6a of the traction battery 1. It is then necessary to deactivate precharging.

In this embodiment of the method described in FIG. 2, the gradual increase in the setpoint voltage continues for a predetermined period once precharging has been deactivated. When the voltage of the electrical network has reached the target voltage value of the electrical network for a predetermined period of time, the various items of equipment of the electrical network are activated.

Figure 3:
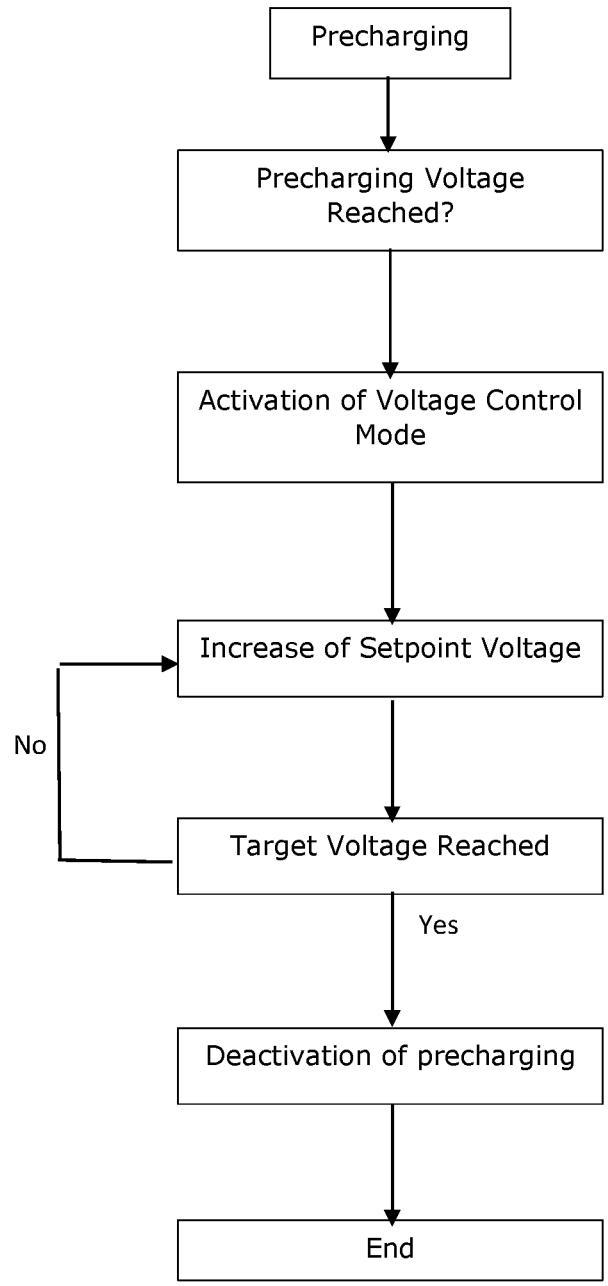
FIG. 3 shows a diagram of the method according to one embodiment of the invention in which the DC-to-DC converter is used as precharging means.

FIG. 3 is a diagram showing the various steps of the method according to one embodiment of the invention. In this embodiment, the capacitors of the electrical network are precharged by the DC-to-DC converter 9.

The DC-to-DC converter 9 is then configured to deliver current to the electrical network so as to precharge the capacitors. As soon as the voltage of the electrical network reaches the predetermined threshold value, the electric machine 4 is activated in voltage control mode. The precharging voltage is then said to have been reached.

According to this embodiment of the invention shown in FIG. 3, the predetermined threshold value is dependent on the voltage operating range of the electric machine.

The electric machine 4 is then configured, by the electronic control unit 10 for example, to deliver an electric current with a setpoint voltage corresponding to an initial setpoint value equal to the voltage of the electrical network.

The setpoint value is then gradually increased so as to reach a target voltage value of the electrical network. In this embodiment, precharging is deactivated once the voltage of the electrical network has reached the target voltage value of the electrical network. In this embodiment of the invention, the target voltage value of the electrical network corresponds to the voltage value for which the various items of equipment of the electrical network may be activated without collapsing the electrical network.

In this embodiment of the method described in FIG. 3, precharging is deactivated once the target voltage of the electrical network has been reached. Once the voltage of the electrical network has reached the target voltage value of the electrical network for a predetermined period of time, the various items of equipment of the electrical network are activated.

The invention claimed is:

1. A method for controlling the activation of an electric machine, in voltage control mode, for an electrical network of a motor vehicle following a failure of a traction battery present in a traction network of said vehicle, the traction network comprising the traction battery, the electric machine, an inverter and a DC-to-DC converter connecting the traction battery to an onboard network of said motor vehicle, the method comprising:
   a first step of precharging capacitors present in the electrical network using a precharging means;
   a second step of activating the electric machine, in voltage control mode, when the voltage of the electrical network has reached a predetermined threshold value, the electric machine delivering an electric current with a setpoint voltage corresponding to an initial setpoint value equal to the voltage of the electrical network;
   a third step of gradually increasing the setpoint voltage;
   a fourth step of determining if there is a reversal of traction battery current;
   a fifth step of deactivating precharging based on the determination that the reversal of traction battery current occurred; and
   a sixth step of continuing to gradually increase the setpoint voltage after precharging is deactivated until the target voltage is reached.

2. The method as claimed in claim 1, wherein the predetermined threshold value of the voltage of the electrical network corresponds to a voltage value within a range of voltage values for which the electric machine is operational in voltage control mode.

3. The method as claimed in claim 2, wherein the precharging means is a DC-to-DC converter.

4. The method as claimed in claim 1, wherein the precharging means is a DC-to-DC converter.

5. The method as claimed in claim 4, wherein the fifth step of deactivating precharging is performed when the value of the voltage of the electrical network is equal to the target value of the voltage of the electrical network.

6. An electrical network in a hybrid or electric motor vehicle, the electrical network comprising a traction battery supplying power to a traction network equipped with an inverter and with a traction electric machine and an onboard network connected to the traction network by a DC-to-DC converter, the electric machine, the converter, the traction battery and the inverter being driven by an electronic control unit present in the onboard network, wherein the electronic control unit comprises means for implementing the control method as claimed in claim 1.

7. A method for controlling the activation of an electric machine, in voltage control mode, for an electrical network of a motor vehicle following a failure of a traction battery present in a traction network of said vehicle, the traction network comprising the traction battery, the electric machine, an inverter and a DC-to-DC converter connecting the traction battery to an onboard network of said motor vehicle, the method comprising:
- a first step of precharging capacitors present in the electrical network using a precharging means;
- a second step of activating the electric machine, in voltage control mode, when the voltage of the electrical network has reached a predetermined threshold value, the electric machine delivering an electric current with a setpoint voltage corresponding to an initial setpoint value equal to the voltage of the electrical network;
- a third step of gradually increasing the setpoint voltage so as to reach a target voltage value of the electrical network; and
- a fourth step of deactivating precharging depending on the voltage of the electrical network, wherein the precharging means is the traction battery.

8. The method as claimed in claim 7, wherein the fifth step of deactivating precharging is performed when the voltage of the electrical network is higher than the value of the target voltage of the electrical network.

9. The method as claimed in claim 8, wherein the target voltage of the electrical network corresponds to the value of the voltage of the electrical network for which the traction battery charges.

10. An electrical network in a hybrid or electric motor vehicle, the electrical network comprising a traction battery supplying power to a traction network equipped with an inverter and with a traction electric machine and an onboard network connected to the traction network by a DC-to-DC converter, the electric machine, the converter, the traction battery and the inverter being driven by an electronic control unit present in the onboard network, wherein the electronic control unit comprises means for implementing the control method as claimed in claim 7.

11. A method for controlling the activation of an electric machine in voltage control mode for an electrical network of a motor vehicle following a failure of a traction battery present in a traction network of said vehicle, the traction network comprising the traction battery, the electric machine, an inverter and a DC-to-DC converter connecting the traction battery to an onboard network of said motor vehicle, the method comprising:
- a first step of precharging capacitors present in the electrical network using a precharging means;
- a second step of activating the electric machine in voltage control mode when the voltage of the electrical network has reached a predetermined threshold value, the electric machine delivering an electric current with a setpoint voltage corresponding to an initial setpoint value equal to the voltage of the electrical network;
- a third step of gradually increasing the setpoint voltage so as to reach a target voltage value of the electrical network; and
- a fourth step of deactivating precharging depending on the voltage of the electrical network, wherein the predetermined threshold value of the voltage of the electrical network corresponds to a voltage value within a range of voltage values for which the electric machine is operational in voltage control mode, and wherein the precharging means is the traction battery.

* * * * *